Jan. 28, 1958  W. PFANNMUELLER ET AL  2,821,006
PROCESS FOR THE MANUFACTURE, FROM PLASTIC MATERIAL, OF HOLLOW
BODIES HAVING PROJECTIONS PROTRUDING FROM THE INNER SURFACE
Filed June 23, 1953  2 Sheets-Sheet 1

INVENTORS:
WILHELM PFANNMUELLER
ALOIS LETSCHERT
THEOPHIL FUCHS
BY Marzall,
Johnston, Cook & Root
ATT'YS

INVENTORS:
WILHELM PFANNMUELLER
ALOIS LETSCHERT
THEOPHIL FUCHS

2,821,006

PROCESS FOR THE MANUFACTURE, FROM PLASTIC MATERIAL, OF HOLLOW BODIES HAVING PROJECTIONS PROTRUDING FROM THE INNER SURFACE

Wilhelm Pfannmueller, Mannheim, and Alois Letschert and Theophil Fuchs, Baumbach, Westerwald, Germany, assignors to Badische Anilin- & Soda-Fabrik Aktiengesellschaft, Ludwigshafen (Rhine), Germany Application June 23, 1953, Serial No. 363,436

Claims priority, application Germany September 27, 1952

5 Claims. (Cl. 25—156)

This invention relates to a process for the manufacture, from plastic material, of hollow bodies having projections protruding from the inner surface.

The process according to this invention permits the production of hollow bodies from plastic material, in particular clay, which are preferably of circular cross-section, but may also be of elliptical or angular cross-section, and which have projections, such as tongues, tabs or the like, protruding from their inner surface. The particular technique of our invention consists in cutting the projections in the wall of the hollow body and bending them away therefrom into the interior of the hollow body in one operation. The cutters used for this purpose are so dimensioned in cross-section as regards length and width as to give the projections wanted and are so shaped in their cutting surface that by penetrating in to the interior of the hollow body, they give the cut-out pieces of the wall the desired deflection. The hollow bodies thus shaped are then hardened in the conventional manner by thermal treatment, such as firing. If hollow bodies having projections at different levels are to be made, a system of cutters, comprising a plurality of sets of cutters, may be used and so arranged one above another that, for example, each set of the cutters lies in one plane and if desired the cutters lying in one plane are staggered relatively to the cutters lying in another plane. In order to prevent the soft hollow body from being deformed while the walls are being cut in and the pieces forming the projections are being bent away, it is supported by a sleeve fitting its inner wall and having cutaway portions corresponding in size to the cross-section of the cutters at the places at which the cutters cut into the wall of the hollow body. The projections are advantageously given such a length towards the interior of the hollow body that they touch in the axis of the hollow body and mutually support each other.

An embodiment of such hollow bodies, which may be used for example as filler bodies in chemical or physical exchange processes between gases and liquids, is shown diagrammatically and by way of example in the accompanying drawings in which.

Figure 1A:
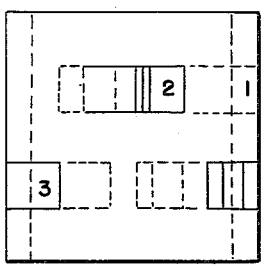
Fig. 1a is a side view of a hollow body manufactured in accordance with the invention.
Figure 1B:
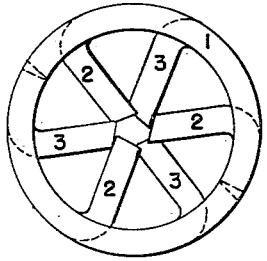
Fig. 1b is a top plan view of the same.

One example of a hollow body manufactured by our process is illustrated in Figs. 1a and 1b which disclose a body having a cylindrical wall 1 provided with projections 2 and 3 which protrude inwardly from the inner surface of the wall 1. The projections 2 are arranged along one peripheral strip of the cylinder above the projections 3 arranged on another peripheral strip of the cylinder.

Figure 2:
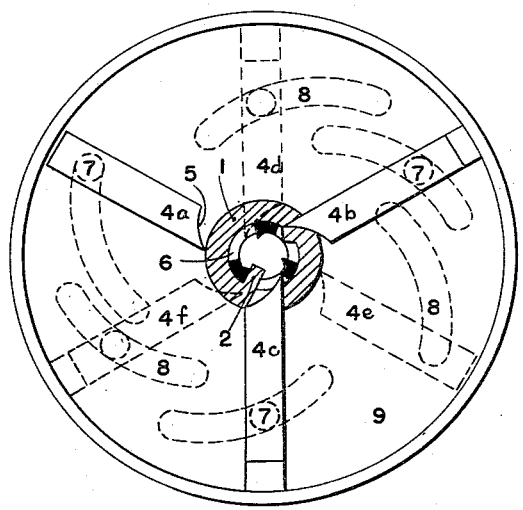
Fig. 2 is a top plan view in schematic form illustrating the manner in which tongue-like projections are formed in a hollow body by means of reciprocating cutters.

Figure 2 is a plan view illustrating the cutting and bending-in of the projections with the aid of three cutters 4a, 4b and 4c lying in one plane corresponding to the peripheral strip upon which projections 2 are to be located, and three cutters 4d, 4e and 4f arranged in another plane lying beneath the first and corresponding to the peripheral strip upon which the projections 3 are to be located. In order to make the shaping process clear, the positions of the cutters of each group (which in fact act simultaneously) are shown in three stages which occur consecutively in time. Cutter 4a is shown in the position in which it just touches the outer wall of the hollow body 1 with its cutting surface 5 which is adapted to the shape of the projection to be formed, while the cutting surface of the cutter 4b has already cut into a part of the wall of the hollow body and pushed it before it. The cutter 4c is shown in a position after the formation of the projection 2. The cutters 4e, 4f and 4d illustrate the same three stages in the cutting and bending operation corresponding to cutters 4a, 4b and 4c, respectively. Of course, it will be understood that all of the cutters reciprocate simultaneously in the cutting and bending operation, and that the different positions of each cutter shown in Fig. 2 is for the purpose of illustration only. The sleeve 6, which concentrically lies against the hollow body, prevents distortion of the soft hollow body during the formation of the projections. The simultaneous actuation of the cutters can be effected in known manner by guiding them by means of pins 7 which move in segmental recesses 8 of a rotatable plate 9.

Figure 3:
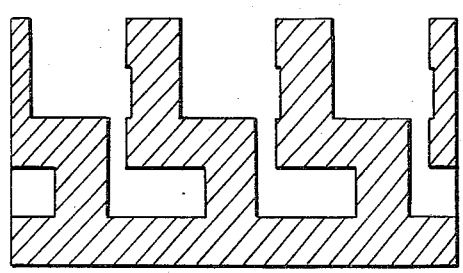
Fig. 3 is a development of a cylindrical sleeve which is positioned concentrically adjacent the inner surface of a cylindrical hollow body during the cutting and bending operation of the process according to the invention.

A development of the sleeve 6 is shown in Figure 3. The cylindrical sleeve has a lower row of openings which correspond to the lower projections 3 of the hollow body 1 of Fig. 1a. A passageway from each of these lower openings extends upwardly to an upper row of openings which correspond to the upper projections 2 of the hollow body 1 in Fig. 1. The sleeve is then cut away above the upper openings to complete a passageway to the end of the sleeve such that the projections can be slidably removed from the sleeve.

Figure 4:
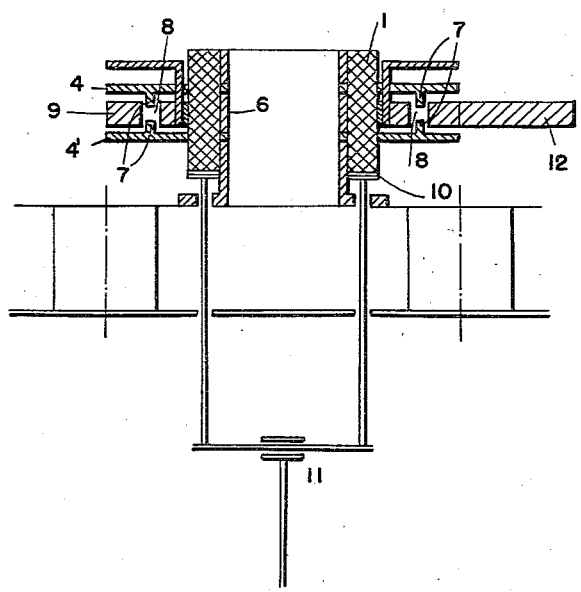
Fig. 4 is a vertical sectional view, in partly schematic form, of suitable apparatus for carrying out the process of this invention.

Figure 4 shows a complete system for the practice of the process according to our invention. The hollow body 1 of mouldable material which is to be provided with projections is placed over sleeve 6, provided with cutaway portions as shown in Fig. 3, and rests on an annular plate 10 which by being shifted upwards with the aid of a piston 11 ejects the finished hollow body from the apparatus. The two sets of cutters 4 and 4', which are arranged one above the other and are staggered with respect to each other, are operated by means of guide pins 7 in segmental recesses 8 in a plate 9 which is turned about its axis with the aid of a lug 12. A barrier (not shown) is provided to arrest the cutters until the ejection piston has returned to its initial position, so that faultily cut hollow bodies cannot be formed. The piston 11 pushes upwardly to eject the hollow body only after the cutters 4 and 4' have completed one reciprocating cycle to completely form inwardly protruding projections.

What we claim is:

1. The method of manufacturing a hollow body having a plurality of tongue-like projections extending inwardly from the inner surface of the body from plastic material which comprises supporting the inner wall of a hollow body of a soft plastic material by a hollow tubular mandrel positioned therein and having a plurality of cutaway portions partially corresponding in dimensions to said projections with at least a part of each said cutaway portions extending to one end of said mandrel for slidably removing said projections therefrom, cutting a plurality of portions of said body corresponding in dimensions to said projections and bending said portions inwardly along one edge of said cutaway portions in one operation by reciprocating cutters operating on said body from its outer surface which are dimensioned to provide the desired size and deflection of said projections, and sliding the resulting body axially of the sleeve for removal therefrom.

2. The method of manufacturing a hollow body having a plurality of tongue-like projections extending inwardly from the inner surface of the body from plastic material which comprises: supporting the inner wall of a hollow body of a soft plastic material by a sleeve positioned therein and having a plurality of openings corresponding in dimensions to said projections, said openings communicating with an end of said sleeve for slidably removing said projections therefrom; cutting portions of said body corresponding in dimensions to said projections and bending said portions inwardly through said openings in one operation by reciprocating cutters simultaneously moved inwardly on said body from the outer surface thereof at points therearound and then simultaneously removed outwardly from said body, said cutters being dimensioned to provide the desired size and deflection of said projections; and sliding the resulting body off of said sleeve such that said projections pass axially of the sleeve through said openings communicating with the end of said sleeve.

3. The method of manufacturing a hollow body having a plurality of tongue-like projections extending inwardly from the inner surface of the body from clay which comprises: supporting the inner wall of a hollow body of soft clay by a sleeve positioned therein and having a plurality of openings corresponding in dimensions to said projections, said openings communicating with an end of said sleeve for slidably removing said projections therefrom; cutting portions of said body corresponding in dimensions to said projections and bending said portions inwardly through said openings in one operation by reciprocating cutters simultaneously moved inwardly on said body from the outer surface thereof at points therearound and then simultaneously removed outwardly from said body, said cutters being dimensioned to provide the desired size and deflection of said projections; and sliding the resulting body off of said sleeve such that said projections pass axially of the sleeve through said openings communicating with the end of said sleeve.

4. The method of manufacturing a hollow body having a plurality of tongue-like projections extending inwardly from the inner surface of the body from clay which comprises: supporting the inner wall of a hollow body of soft clay by a sleeve positioned therein and having a plurality of openings corresponding in dimensions to said projections, said openings communicating with an end of said sleeve for slidably removing said projections therefrom; cutting portions of said body corresponding in dimensions to said projections and bending said portions inwardly through said openings in one operation until different said portions meet for mutual support adjacent the axis of said body by reciprocating cutters simultaneously moved inwardly on said body from the outer surface thereof at points therearound and then simultaneously removed outwardly from said body, said cutters being dimensioned to provide the desired size and deflection of said projections; and sliding the resulting body off of said sleeve such that said projections pass axially of the sleeve through said openings communicating with the end of said sleeve.

5. The method of manufacturing a hollow body having a plurality of tongue-like projections extending inwardly from the inner surface of the body from clay which comprises: supporting the inner wall of a hollow body of soft clay by a sleeve positioned therein and having a plurality of openings corresponding in dimensions to said projections, said openings communicating with an end of said sleeve for slidably removing said projections therefrom; cutting portions of said body corresponding in dimensions to said projections and bending said portions inwardly through said openings in one operation until different said portions meet for mutual support adjacent the axis of said body by reciprocating cutters simultaneously moved inwardly on said body from the outer surface thereof at points therearound and then simultaneously removed outwardly from said body, said cutters being dimensioned to provide the desired size and deflection of said projections; sliding the resulting body off of said sleeve such that said projections pass axially of the sleeve through said openings communicating with the end of said sleeve; and hardening said resulting body by thermal treatment.

References Cited in the file of this patent

UNITED STATES PATENTS

| | | |
|---|---|---|
| 393,721 | Revol | Nov. 27, 1888 |
| 1,705,093 | Owen | Mar. 12, 1929 |
| 2,075,038 | Hutchinson | Mar. 30, 1937 |
| 2,217,327 | Zeidler | Oct. 8, 1940 |
| 2,326,536 | Hartsock et al. | Aug. 10, 1943 |
| 2,653,664 | Dolby | Sept. 29, 1953 |